Figure 1:
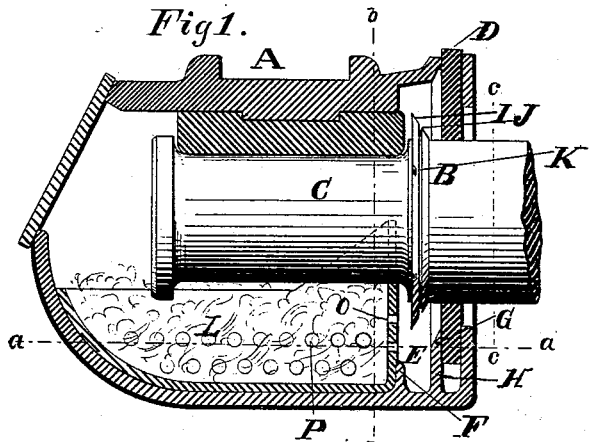

(No Model.) 2 Sheets—Sheet 1.

H. MILLHOLLAND.
CAR AXLE BOX.

No. 270,908. Patented Jan. 23, 1883.

WITNESSES:
N. H. Newton
John Tolley Jr.

Henry Millholland
INVENTOR
By his Attorneys
W. C. Strawbridge
J. Bonsall Taylor

N. PETERS. Photo-Lithographer, Washington, D. C.

(No Model.) 2 Sheets—Sheet 2.

H. MILLHOLLAND.
CAR AXLE BOX.

No. 270,908. Patented Jan. 23, 1883.

*Fig. 8.*     *Fig. 9.*     *Fig. 10.*

WITNESSES:

Henry Millholland
INVENTOR
By his Attorneys,

UNITED STATES PATENT OFFICE.

HENRY MILLHOLLAND, OF PHILADELPHIA, PENNSYLVANIA, ASSIGNOR OF NINE-TWENTIETHS TO ROBERT W. LESLEY AND CHARLES V. GRANT, BOTH OF SAME PLACE.

CAR-AXLE BOX.

SPECIFICATION forming part of Letters Patent No. 270,908, dated January 23, 1883.

Application filed July 28, 1882. (No model.)

*To all whom it may concern:*

Be it known that I, HENRY MILLHOLLAND, a citizen of the United States, residing at Philadelphia, in the county of Philadelphia and State of Pennsylvania, have invented an Improvement in Car-Axle Boxes, of which the following is a specification.

My invention relates to a class of devices known as "car-axle boxes," and its object is, first, thorough and constant lubrication of the journal, and, second, economy in the use of lubricant. The lubricant commonly used in car-axle boxes, being that to which this device is adapted, is oil mixed with and held in suspension by woolen waste or equivalent capillary substance. The waste is saturated with the oil previous to its introduction into the box. This waste saturated with oil is termed "packing."

My invention embraces certain improvements hereinafter detailed, whereby the oil used to lubricate the journal is not only retained in contact with the under surfaces of the journal, but is also prevented from escaping from the axle-box, and is returned to the waste as rapidly as it is expressed therefrom, with the result that the consumption of the lubricant is reduced to a minimum and a very constant and effectual lubrication secured.

In order to establish the requisite contact between the packing and the journal, it is in old-fashioned boxes necessary to press the packing into the box forcibly. The result of this forcible pressure is that much of the oil contained in the waste at the time of its introduction into the box is expelled, and there being no provision in boxes as ordinarily constructed for its return to the waste, it is rendered of no avail for continuous lubrication.

The object of my invention is to provide for the continuous return to the packing of the lubricant that heretofore was not returned.

Specifically considered, my invention consists in the provision, within an ordinary or old-fashioned axle-box, of a channel or reservoir, so to speak, for the reception of lubricant expelled from the packing in the operation of filling the box, the said channel being formed by the employment of a removable packing-receptacle of a novel construction, hereinafter set forth; and my invention further consists in certain improvements in axle-collars, also hereinafter described.

The accompanying drawings represent a convenient embodiment of a preferred construction of my invention.

Figure 2:
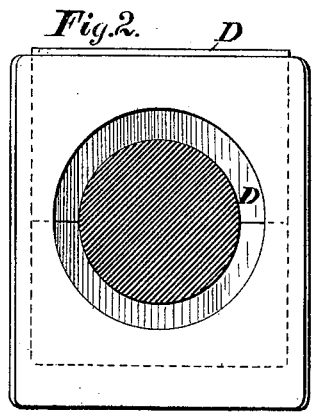
Figure 3:
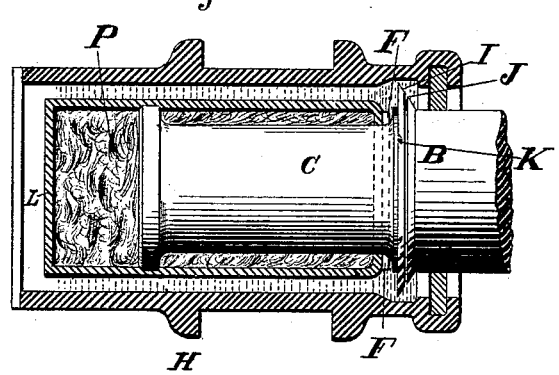
Figure 4:
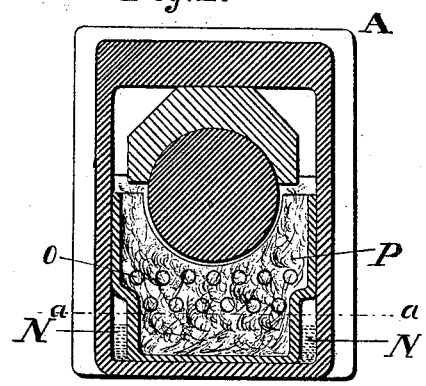
Figure 5:
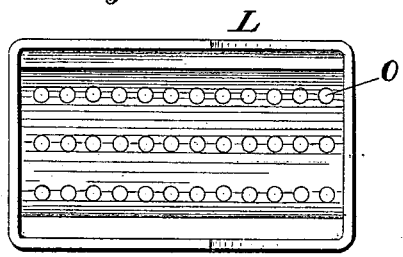
Figure 6:
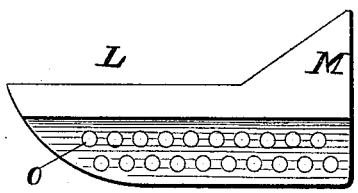
Figure 7:
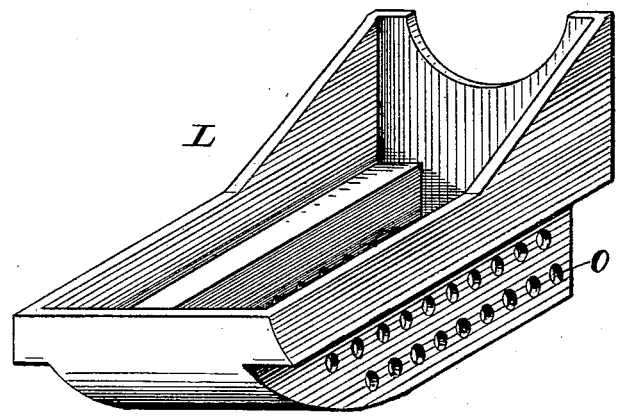
Figure 7:
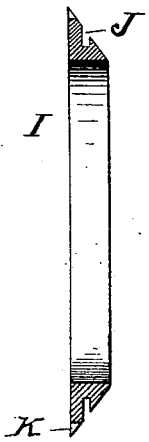
Figure 7:
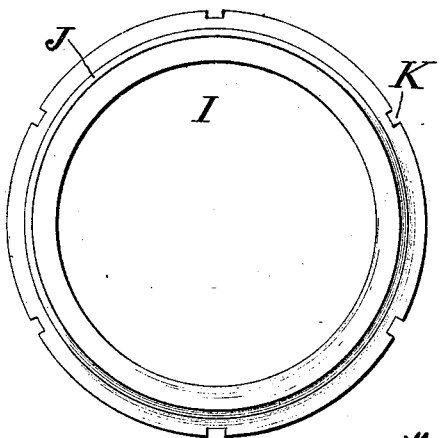
Figure 7:
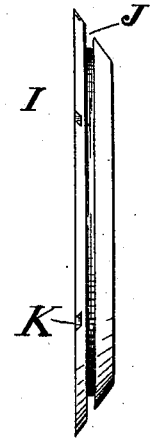

In the drawings, Figure 1 is a view in central vertical longitudinal section of the box complete. Fig. 2 is a rear elevation of the box, the axle being in section. Fig. 3 is a sectional top plan view through the box, section being supposed on the line $a\ a$ of Fig. 1 and Fig. 4. Fig. 4 is a vertical sectional elevation taken through the box on the line $b\ b$, Fig. 1, viewed from the left-hand side of said figure or from the front of the box. Fig. 5 is a top plan view. Fig. 6 is a side elevation, and Fig. 7 is a perspective view of a preferred form of my improved removable packing-tray. Figs. 8, 9, and 10 are respectively a central vertical side section, a rear elevation, and a side elevation of my improved axle-box collar.

Similar letters of reference indicate corresponding parts in all the figures.

The following is a description of my invention:

In the accompanying drawings, A represents a well-known form of axle-box. B is the axle and C the journal thereof. D is a sectional washer, preferably made in two parts, fitted around the axle, adapted to the rear face of the box, so as to be readily inserted therein, and designed to exclude dust. E is a cavity formed transversely across the rear base of the box by the erection of one or more studs or projections, F; and G is an inclined surface upon the interior wall, H, substantially of the character employed by me in an improved axle-box for which Letters Patent of the United States No. 260,112 were granted me June 27, 1882. In line above the cavity E, and to the front of the inclined surface referred to, is my improved form of axle-box collar I.

The collar above referred to relates to a class of devices employed upon axles for the return of the lubricant by centrifugal force to the interior of the axle-box. Ordinarily these collars are formed as a conical-faced ring, shrunk or otherwise secured upon the axle, and fashioned in the form represented in my former patent. My improvement consists in circumferentially channeling the collar, as indicated by the letter J, and in notching the extreme edge or periphery of the collar at different points, as at K. The notches retain the oil, which in the operation of the device accumulates upon the revolving collar until they hold a sufficient quantity to be thrown from the periphery of the collar, while the groove collects any oil that may run down the inclined face of the collar when at rest, and conducts it to the lowermost portion, whence it drops into the cavity E. The collar not only performs its usual function of intercepting the lubricant on its way of escape along the axle and of returning it centrifugally to the interior of the box, where it is again absorbed by the packing and conducted to the axle for lubrication, but it also performs these usual functions in a very thorough and effective manner.

L is my improved removable packing-tray, being a perforated box of metal or other suitable material, substantially of the form represented in the drawings—that is to say, throughout the length of its upper side portions and at the front practically conformed to or fitted within the interior of the axle-box, and at the back extended upward from both sides so as to form a high bridge-wall or back reaching across the axle-box from side to side, the top of which bridge-wall is cut out so as to partially encircle the journal. The lower portion of this tray rests flat upon the bottom of the box, so as to afford no intentional interspace or crevice for oil, and said lower portion is contracted lengthwise on both sides, as is well represented in Figs. 4 and 7, in order to provide two longitudinal channels, N, between the lower portion of the exterior walls of the tray and the lower portion of the walls of the box. These channels communicate with the passage or cavity E and form a trough surrounding the tray on three sides. This trough is the reservoir for the expelled lubricant. The sides and back of the tray are perforated with a series of holes, O, which afford means of entrance for the expelled lubricant from the trough to the packing in the tray, as well as means for its escape into the trough when the packing is introduced.

P represents the packing, which is pressed within the tray and held thereby in forcible contact with the journal, and which, by reason of the breadth of the upper portion of the tray, (a breadth greater than its lower portion, and at least equal to that of the diameter of the journal,) and of the arrangement of its high back and sides, is held in contact with almost the entire under surface of the journal, thereby insuring constant and extended lubrication.

While it is advisable as an expedient of construction that the upper portion of the tray should be of the exact breadth of the box, yet so long as it is of the breadth of the axle and greater than the lower portion it is sufficient for the purposes of my invention.

Having thus described my invention, I claim and desire to secure by Letters Patent of the United States—

1. The packing-receptacle hereinbefore described, being a perforated box of metal, the upper portion of which is of the breadth of the journal, but which is reduced in size lengthwise as to its lower portion along both sides, in combination with an axle-box conformed to receive it, and of such dimensions as to afford a trough or channel for lubricant between its lower inner side walls and the outer side walls of said receptacle.

2. As a new article of manufacture, a removable packing-tray for axle-boxes, being a perforated box of metal provided with a high back or bridge-wall, and being reduced in size lengthwise as to its lower portion along both sides, substantially as set forth.

3. As an improvement in axle-box collars, a ring the exterior surface of which is conical or angled backwardly away from the face or front extremity of the journal, and which is provided with a circumferential channel in said inclined face.

4. As an improvement in axle-box collars, a ring which is provided with one or a series of notches, for the purpose specified.

5. As an improvement in axle-box collars, a ring the exterior surface of which is conical or angled backwardly away from the face or front extremity of the journal, and which is provided with a circumferential channel in said inclined face, and with one or more notches on its peripheral edge.

In testimony whereof I have hereunto signed my name this 19th day of July, 1882.

HENRY MILLHOLLAND.

In presence of—
R. W. LESLEY,
J. BONSALL TAYLOR.